US007275184B2

(12) United States Patent
Wolff et al.

(10) Patent No.: US 7,275,184 B2
(45) Date of Patent: Sep. 25, 2007

(54) SOFTWARE VERIFICATION METHOD FOR CONTROL UNITS AND VERIFICATION SYSTEM

(75) Inventors: Hans-Joerg Wolff, Schorndorf (DE); Thomas Zurawka, Stuttgart (DE); Joerg Schaeuffele, Erligheim (DE)

(73) Assignee: Robert Bosch GmbH, Stuttgart (DE)

( * ) Notice: Subject to any disclaimer, the term of this patent is extended or adjusted under 35 U.S.C. 154(b) by 108 days.

(21) Appl. No.: 10/489,070

(22) PCT Filed: Jul. 24, 2002

(86) PCT No.: PCT/DE02/02725

§ 371 (c)(1),
(2), (4) Date: Sep. 2, 2004

(87) PCT Pub. No.: WO03/027850

PCT Pub. Date: Apr. 3, 2003

(65) Prior Publication Data

US 2005/0022166 A1 Jan. 27, 2005

(30) Foreign Application Priority Data

Sep. 7, 2001 (DE) ................................ 101 44 050

(51) Int. Cl.
*G06F 11/00* (2006.01)
(52) U.S. Cl. ...................................................... 714/39
(58) Field of Classification Search .................. 714/28, 714/38, 39
See application file for complete search history.

(56) References Cited

U.S. PATENT DOCUMENTS 5,313,618 A * 5/1994 Pawloski ..................... 703/28

(Continued)

FOREIGN PATENT DOCUMENTS

DE 199 59 247 6/2001

(Continued)

OTHER PUBLICATIONS

Klaus Oertel, *Code by Click—From Idea to Finished Product With ASCET-SD 3.0*, Elektronik Industrie, Apr. 1999, pp. 95-6.

(Continued)

*Primary Examiner*—Scott Baderman
*Assistant Examiner*—Joshua Lohn
(74) *Attorney, Agent, or Firm*—Kenyon & Kenyon LLP

(57) ABSTRACT

A method and system for the verification of software functions for a control unit, using a simulation model to simulate the software functions and the control unit, the software code for the software functions being generated automatically from the identical simulation model, firstly for a first experimental control unit and secondly for a second standard control unit, identical input variables for the software functions being used on both control units and the output variables of both control units resulting therefrom being detected synchronized in time, i.e., simultaneously, the software functions being verified through comparison of the output variables of both control units.

11 Claims, 3 Drawing Sheets

U.S. PATENT DOCUMENTS

| | | | | |
|---|---|---|---|---|
| 5,515,504 | A | * | 5/1996 | Le Van Suu .................. 714/28 |
| 5,551,050 | A | * | 8/1996 | Ehlig et al. .................... 714/11 |
| 5,946,472 | A | * | 8/1999 | Graves et al. ................. 703/6 |
| 5,960,188 | A | * | 9/1999 | Linke et al. .................. 703/14 |
| 6,332,201 | B1 | * | 12/2001 | Chin et al. .................... 714/28 |
| 6,973,417 | B1 | * | 12/2005 | Maxwell et al. ............... 703/2 |
| 7,035,784 | B1 | * | 4/2006 | Gillis .......................... 703/17 |
| 2003/0088710 | A1 | * | 5/2003 | Sandhu et al. .............. 709/321 |

FOREIGN PATENT DOCUMENTS

| WO | WO 81 00475 | 2/1981 |
|---|---|---|

OTHER PUBLICATIONS

Douglas Hoffmann, *A Taxonomy of Test Oracles*, Online internet article, Jan. 16, 1998, pp. 1-4. URL:http://softwarequalitymethods.com/SQM/Abstracts/ATaxonomyabstract.PDF (Found Sep. 19, 2003).

B. Milne, *Entry-Level System Integrates Microprocessor Development Tools*, Electronic Design, Penton Publishing, Cleveland, OH, vol. 36, No. 2, Jan. 21, 1988, pp. 43-44, 46, and 48.

Spörl et al., *Software Platform for Control-Device Tests Fundamentally Improved*, Electronik Automotive, 2000, pp. 104-106.

* cited by examiner

SOFTWARE VERIFICATION METHOD FOR CONTROL UNITS AND VERIFICATION SYSTEM

FIELD OF THE INVENTION

The present invention relates to a method and a system for the verification of software functions for a control unit according to the independent claims. Furthermore, the present invention relates to a computer program, including program code elements for executing a method for software verification.

BACKGROUND INFORMATION

The increasing complexity of the control unit functions and/or of the individual automobile control units (electronic control units, ECU), but also the increasing networking and interaction of the control units and control unit functions in the vehicle composite system, as well as increased quality and safety requirements, make the verification of the software functions difficult and very complex. This also applies to the networking of control units and modules in other technical fields, such as machine tool manufacture, automation, etc. Currently, the software release for the individual systems is performed through systematic testing in the electronic composite system. Precisely in the field of automobiles, this is frequently only possible in the vehicle and is accordingly costly. In this case, under defined environmental conditions, fixed driving situation catalogs are run through in order to achieve the highest possible coverage during the software test. Since only very limited memory and run-time resources are available in standard control units for reasons of cost, the use of established test technologies, such as for code coverage analysis during the software release, is frequently not possible or is associated with increased costs.

This may be seen in German Published Patent Application No. 199 59 247 in that an additional code coverage memory is necessary for registering the code coverage. Thus, the invention in the unexamined patent application cited shows a microcomputer for use in a control and/or regulation unit for regulating a process in a motor vehicle. In order to be able to determine the code coverage of a control and/or regulation program of the microcomputer even while the motor vehicle is being driven, it is suggested that the microcomputer contain a code coverage memory, in addition and in parallel to the program memory and data memory, which is connected to the microprocessor via the address bus and the data bus. In this case, information may then be stored in the code coverage memory about which addresses of the program memory and/or the data memory are addressed in the framework of a write or read access during the execution of a control program from the program memory by the microcomputer while the motor vehicle is being driven. In this case, as a possible testing method for programs from the related art, the code coverage method for determining the code coverage is performed by a system execution analyzer. In this case, all addresses of the microprocessor applied to an external address bus result in an identifier in a memory overview. The address regions not identified at the end of the test were therefore not addressed in the framework of the performance of the program and the corresponding program parts were therefore not run. Through such an analysis of the test gaps, untested functions and faulty implementation of functional requirements may be recognized and corrected, for example.

However, if an additional code coverage memory and the corresponding computing time are not available, which is typical in a standard control unit, the method according to German Published Patent Application No. 199 59 247 is therefore not feasible. Then, except for the measurement of internal control unit variables, no access to the control unit software and/or the corresponding software functions is possible and the software functions may then only be tested as a black box. This situation leads to a goal conflict with the high real-time capability and reliability of the systems which is simultaneously required.

Since, in the near future, control unit software will also control and monitor safety-relevant driving functions, such as in X-by-wire systems, the quality requirements for software development and verification in embedded control systems will increase further.

The object of the present invention is to specify a method for verifying the software functions and/or the software code on the basis of an exactly defined, integrated function development process, using which the quality of the software may continue to be ensured, in order to optimize the situation resulting from the related art. For this purpose, besides the method, a system for verification and a corresponding computer program are also the object of the present invention.

SUMMARY OF THE INVENTION

For this purpose, the present invention relates to a method and a system as well as a corresponding computer program for the verification of software functions for a control unit using a simulation model to simulate the software functions and the control unit, the software code for the software functions advantageously being generated automatically from the identical simulation model, firstly for a first experimental control unit and secondly for a second standard control unit, identical input variables for the software functions being used on both control units and the output variables of both control units resulting therefrom being detected synchronized in time, i.e., simultaneously, the software functions being verified through comparison of the output variables of both control units.

Therefore, a uniform simulation model is used as a basis for both the experimental control unit, i.e., the experimental target, and the standard control unit, i.e., the ECU target. On this basis, target identical prototyping of the functions modeled in the simulation model, e.g., ASCET-SD, on the experimental target and the simulation of the functions through the control unit input variables are then performed. In addition, the conversion of the software functions from the identical model for the standard control unit, i.e., the ECU target, is also performed automatically from the simulation model with the aid of target code generation. The verification is then performed through parallel function testing on the experimental target and ECU target.

In this case, the detection and the comparison of the output variables and/or the intermediate variables leading to the output variables of the standard control unit, i.e., the ECU target, with those of the experimental target or the experimental control unit are performed automatically by the experimental control unit.

In this case, the software code for the software functions is advantageously generated for the experimental control unit and the standard control unit using different generation means in each case, i.e., translated either for the same processor or for different processors using different compilers in particular.

In an advantageous embodiment, the code coverage, i.e., the paths run through in the software code and/or in the software functions, is also detected during the verification of the software functions to determine the software code coverage on the experimental control unit, the experimental target, or on the standard control unit, which has the advantage for the ECU target that it includes hardware-dependent or platform software.

In a preferred embodiment, the software functions are used for controlling operating sequences in a vehicle in this case and are then correspondingly verified using the method, the system, and the corresponding computer program.

In an especially advantageous and cost-effective embodiment, the overall verification of the software functions is performed using a simulation means, such as LabCar, which simulates a vehicle and/or vehicle components and/or vehicle functions, without the use of a real vehicle.

The software code of the software functions is advantageously divided into hardware-dependent software code and hardware-independent software code. In this case, the hardware-dependent part, for example, the operating system and the hardware abstraction layer, is used to define general standardized interfaces for the interface to this hardware-dependent software code part for different, selectable, hardware-independent software code parts, the hardware-independent software code part containing the software functions for controlling the operating sequences in a vehicle.

Therefore, besides the software verification, a multistage function development process, using which the software quality may be increased and the development risk may be minimized in each phase, also results, which provides a high potential for cost savings.

DETAILED DESCRIPTION

Figure 1:
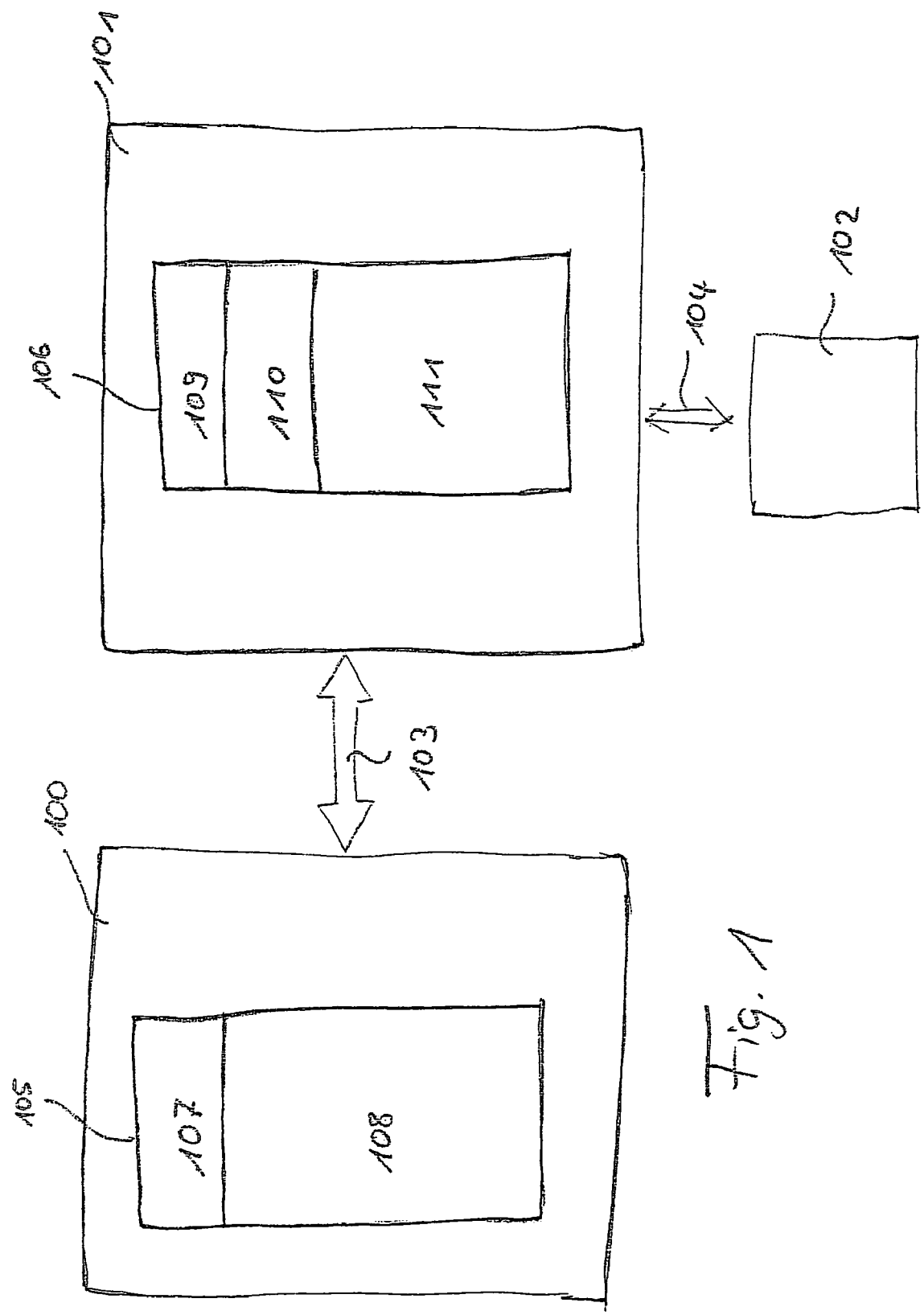
FIG. 1 shows a standard control unit, i.e., an ECU target and an experimental target with the software architecture shown in each case.

For this purpose, FIG. 1 shows a standard control unit 100, the ECU target, and experimental control unit 101, the experimental target. Both control units 100 and 101 are connected via a communication link 103. Depending on the application, this communication link may be unidirectional or bidirectional, serial or parallel, etc. Furthermore, a visualization and/or analysis means 102, which is also referred to in the following as a GUI or graphical user interface, is connected to experimental target 101. The link itself, whether parallel or serial and unidirectional or bidirectional, is identified with 104 here. This visualization means 102 may, as already noted, also include an analysis capability, i.e., a computing unit and/or a memory unit, this GUI also being able to be integrated in the experimental target.

The ECU software architecture and the software architecture of the experimental target are symbolically shown using blocks 105 and 106. The architecture of the software and/or of the software functions of the standard control unit, i.e., the ECU software, has a central significance, such as for component and variant production, reuse and portability, as well as the support of interfaces of the standard control unit for development tools. The development process and the software architecture must therefore be observed jointly. A layered architecture is advantageous in this case, in which a separation of the actual control unit functionality, i.e., the hardware-independent software functions such as application software, from the hardware-dependent software layers of the platform software is performed. The platform software may thus be reused for multiple projects and the interfaces for access to the control units are also advantageously standardized. In this way, the use of standardized methods and/or tools tailored to these standard interfaces is possible during the development, the verification, and also in manufacturing and service, e.g., for rapid prototyping, debugging, measurement, and calibration. In addition, the functions of the application software and/or the software functions, in particular for controlling operating sequences in a vehicle, may be specified independently of hardware and are therefore portable to different control unit platforms.

For example, a block of data 107 is contained in block 105 which includes the totality of the data, i.e., input and output variables, measured data, internal intermediate variables, etc. This data of the functions is essentially identical in block 107 and block 109 in the framework of the software functions. However, further software code and/or further software functions are no longer directly accessible in software block 105, so that block 108 displays black box behavior and essentially only measurement and calibration in regard to data block 107 are possible on the ECU target.

In addition, experimental target 101 is used for the later verification, with which access to the behavior of the functions and/or the software functions is also possible in block 110, in addition to data block 109, in the framework of the hardware-independent software. For the experimental target, black box behavior is therefore only shown in block 111, i.e., in regard to the platform software. The operating system, for example, OSEKOS or ERCOS, as well as automotive services and the abstraction layer addressed, hardware abstraction layer HAL, are embedded therein. The independence of the higher-order software layers, in particular the application software, which describe and/or contain the behavior and data of the software functions, is made possible through this abstraction layer.

Figure 2:
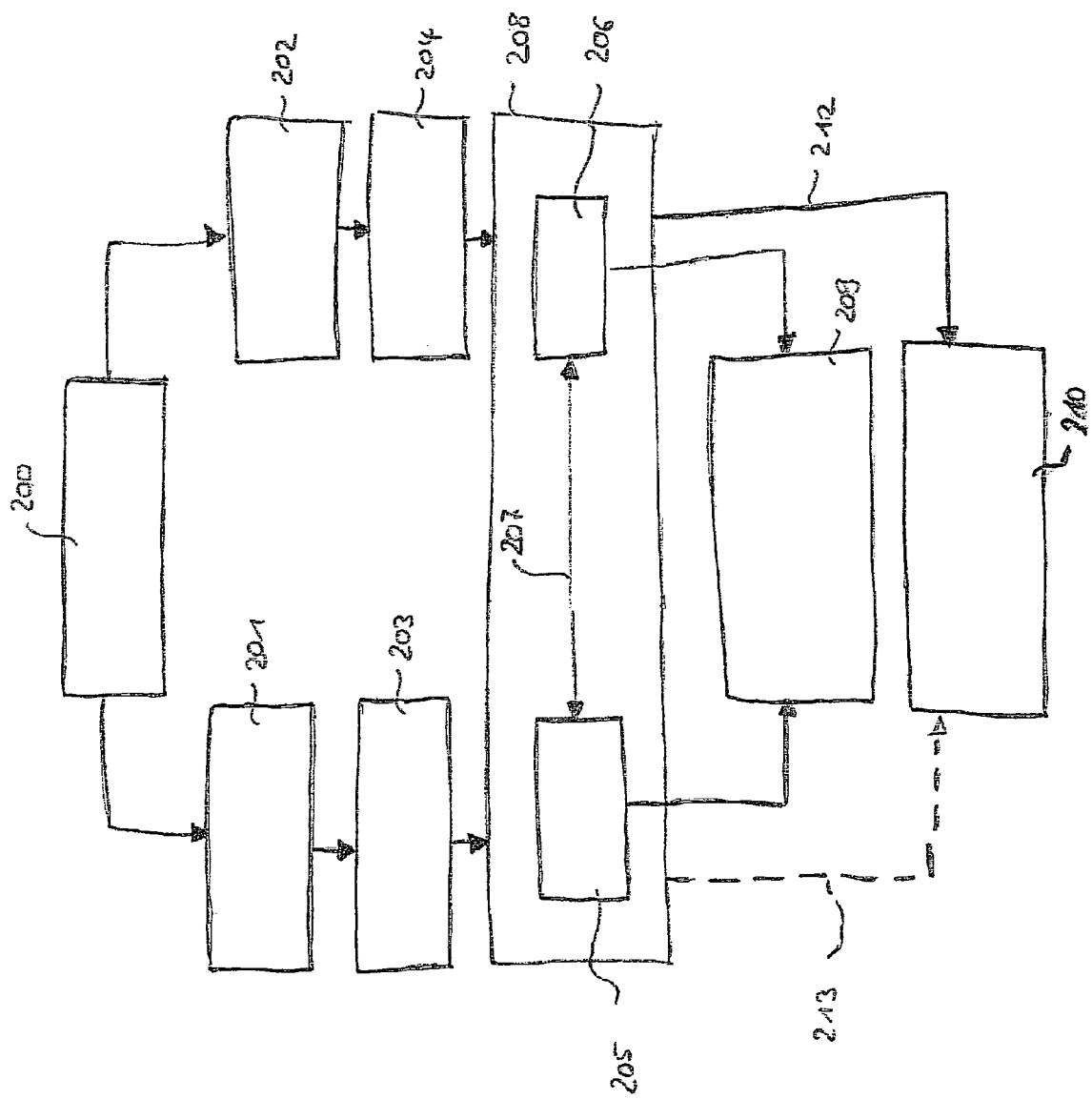
FIG. 2 shows a flow chart of the sequence of the method for software verification.
Figure 3:
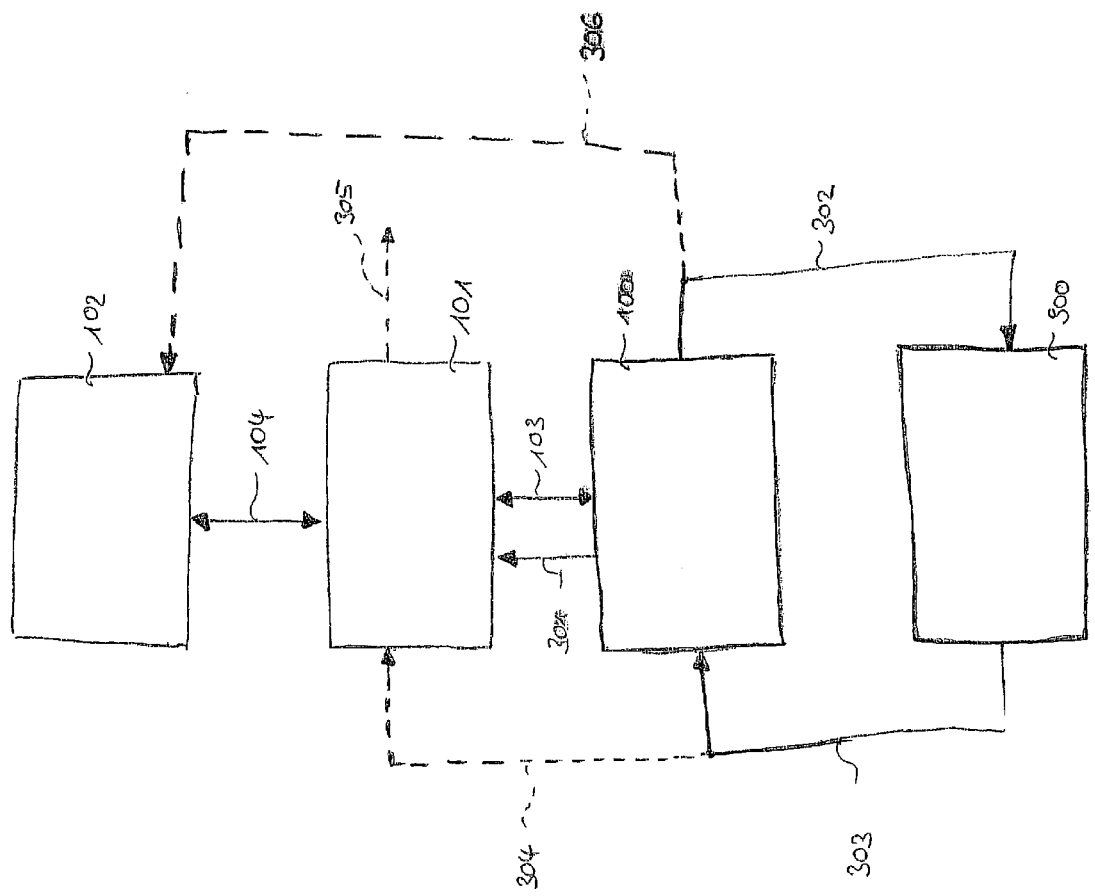
FIG. 3 shows once again the data and control flow in relation to the method for software verification according to the present invention.

In order to allow the verification of the software functions and/or of the software code, as is also described in further FIGS. 2 and 3, the software structure is essentially identical between standard control unit, i.e., ECU target, and experimental target, i.e., the experimental control unit. It is also important, in order to describe it later, to show the time synchronism in the framework of the verification, the basic operating system or each of the basic operating systems having identical time behavior, identical or comparable operating systems, standard operating systems such as OSEK and other standards such as ASAM in particular advantageously being taken into consideration and used.

Through the ability to access the data and the behavior of the software functions, in blocks 109 and 110, in contrast to the standard control unit, rapid prototyping or, through use of the identical simulation model, ASCET-SD target identical prototyping of the functions modeled in ASCET-SD on the experimental target and simulation of the functions through the input variables of the standard control unit are possible.

The simulation model and/or the associated development tool, such as ASCET-SD, supports graphical, physical, and component-based modeling of functions of the hardware-independent software for this purpose, in particular the application software, the simulation and rapid prototyping using the experimental target, i.e., the target identical prototyping, as well as the automatic target code generation for implementation on the standard control unit, the target system. In addition, a complete description file is generated in a standard format, such as ASAM-MCD2, for all measured and adjustable variables of a control unit by the simulation model and/or the corresponding development tools, through which standardized measurement and calibration tool interfaces are possible.

In FIG. 2, the method sequence is shown starting from the preparation of the simulation model in block 200. In this case, the simulation model, in particular ASCET-SD, is "single source" for the hardware-independent software functions in particular, i.e., it is the basis for both the standard control unit, i.e., the ECU target, and the experimental control unit. In block 201, the target code generation is performed in regard to the ECU target for the software functions from the simulation model for the standard control unit produced in block 200.

The target identical prototyping of the functions modeled in the simulation model is also performed automatically on the experimental target in block 202. In this case, target identical prototyping means that the overall arithmetic behavior and the time behavior are specified and simulated (on the experimental control unit) and corresponds virtually exactly to the system behavior of the standard control unit.

The software code is then generated in block 203, in particular through compilation in C for the ECU target. In this case, the software code may be provided in any arbitrary programming language; the example C, as well as C++ or Java, etc., is not to be understood as restrictive in regard to the object according to the present invention. The conversion into the software code cited for the experimental control unit is performed in the same way in block 204.

The actual software verification is now performed in block 208 and block 209. For this purpose, a function test is performed in parallel in time on standard control unit 205 and experimental control unit 206 in block 208, data being able to be exchanged via link 207 as indicated. In this case, the test cases for standard control unit and experimental control unit are identical. Thus, for example, for floating-point arithmetic of the experimental target in particular (fixed-point arithmetic is also possible, for example) and fixed-point arithmetic on the standard control unit, for example, a comparison between floating-point arithmetic and fixed-point arithmetic becomes possible. In this way, it is possible to investigate the influence of quantization and overflow effects on the standard control unit, i.e., the ECU target, early in order to allow a display of inadequacies in regard to the implementation and possibly correct them automatically in particular.

The starting variables are then measured and compared in regard to the software functions, preferably on the experimental control unit, in block 209. The measurement on standard control unit and experimental control unit and/or the detection of the values and their comparison is performed simultaneously and synchronized in time in this case. Therefore, in summary, software verification using target identical prototyping and target code generation is possible. Identical code generator options for the target identical prototyping and the target code generation may be available, due to which fixed-point arithmetic is then used on both targets and/or control units. As previously indicated, identical operating systems, an OSEK operating system, such as ERCOS, in particular, and identical service routines as in the standard control unit are advantageously used on the experimental target.

Optionally and additionally, a code coverage analysis is possible using block 210, either via link 212 to the experimental target or even optionally via link 213 to the standard control unit. For this purpose, the software code automatically generated by the simulation model in particular, C code in particular, is instrumented. For this purpose, commercial coverage tools for code instrumentation and/or for coverage analysis may be linked into the simulation model in order to achieve the goal of reaching high coverage (path and/or branch coverage).

Thus, for example, with the assumption of 100% target identical prototyping, 100% branch coverage on the ECU target may be concluded from 100% branch coverage for the hardware-independent software functions.

Alternatively, the code coverage analysis may also be executed on the ECU target, via link 213 as shown, it being advantageous in this case if the code coverage analysis is executed directly on the software code of the standard control unit, and the hardware-dependent software component, the platform software, is therefore also covered.

From an identical simulation model, such as ASCED-SD, C code in particular is generated as software code for two paths for later verification, for the ECU target using target code generation and for the experimental target using target identical prototyping. For the comparison between floating-point arithmetic on the experimental control unit and fixed-point arithmetic on the standard control unit, identical test stimuli, i.e., identical input variables in particular, are used and a simultaneous and synchronized measured value detection, i.e., a detection of the output variables, is performed on both control units.

The measurement and simulation environment is advantageously integrated into the experimental control unit in this case and may be used either in the laboratory, on the testing stand, or in the vehicle. The measured variable comparison, i.e., the comparison of the output variables, is advantageously calculated on the experimental control unit. Due to the diversity of the platforms used, including compilers and code generator sets, the investigation and checking of code generator optimizations, especially for the standard control unit, the identification of code generator, compiler, and processor problems and/or faults, and the recognition of timing problems of the standard control unit also become possible. This will now be explained again in greater detail on the basis of the data and control flows in FIG. 3.

In FIG. 3, block 101 again shows the experimental control unit and block 100 again shows the standard control unit. Standard control unit 100 receives specific input variables via link 303 and outputs output variables or measured variables in accordance with the software functions via link 302. Block 300, the controlled system, may be the vehicle, as already noted; in addition, it may be a simulation environment such as the representation of different vehicle functions and/or the entire vehicle in the laboratory as LabCar, through which the entire testing sequence may be relocated into the laboratory and automated together with such a LabCar. The input variables of the real standard control unit may be transmitted to the experimental control unit via bidirectional link 103 or alternatively using link 304 of the experimental control unit in this case, for example. The measured variables or output variables of the standard control unit may also be transmitted to the experimental control unit for comparison, if this comparison is executed thereon, via link 103. Line 301 and/or the symbolic signal flow represents a trigger from the ECU target to the experimental target, for example. The output variables of the standard control unit may also be transmitted via path 306 to a visualization and, in some circumstances, analysis system GUI 102, which is connected to the experimental control unit via link 104, bidirectionally in particular. Integration of the GUI into the experimental control unit is also possible in principle here.

The output variables of the experimental target or even the comparison results may also optionally be transmitted via a path 305 to further analysis means or display means. The output variables of the software functions of experimental control unit and standard control unit are compared in the experimental control unit in particular, but also alternatively in a visualization or analysis unit, such as 102, or connected to path 305. If the output variables are identical, target identical prototyping in regard to the independent software functions has been achieved. If the output variables differ, there are problems with either the code generator, the compiler, the processor, the service routines or the timing of the standard control unit, the ECU timing, and these may be displayed as faults and covered using corresponding fault responses. This fault coverage is secured in that separate paths are used; not only in that two processors—one in the experimental target and one in the ECU target—are used, but also if these are optionally not the same type, as well as using different compilers, in order to prevent the fault repetition in both paths and discover the faults and/or problems.

The method described above is executed automatically on the verification system shown in the framework of a computer program having program code elements. In this case, individual program code elements are processed in order to achieve the method steps according to the present invention as described in the claims. The program code elements which run and/or are performed during execution on a computer and/or the verification system then result in the method steps described of the system according to the present invention. In this case, the program code elements are stored on any arbitrary data carrier (in-system or external), i.e., RAM, ROM, EPROM, CD-ROM, diskette, etc., before or for the execution.

What is claimed is:

1. A method for verifying software functions for a control unit in accordance with a simulation model to simulate the software functions and the control unit, comprising:
   automatically generating a software code for the software functions from the simulation model, the simulation model being identical, firstly for a first experimental control unit and secondly for a second standard control unit;
   using identical input variables for the software functions on the first experimental control unit and the second standard control unit;
   detecting as synchronized in time output variables of the first experimental control unit and the second standard control unit resulting from the input variables; and
   verifying the software functions through a comparison of the output variables of the first experimental control unit and the second standard control unit.

2. The method as recited in claim 1, wherein:
   the detecting and the comparison of at least one of the output variables and intermediate variables leading to the output variables are performed automatically by the first experimental control unit.

3. The method as recited in claim 1, wherein:
   the software code for the software functions is generated for one of the first experimental control unit and the second standard control unit using different generation units in each case.

4. The method as recited in claim 1, wherein:
   paths running through in at least one of the software code and in the software functions are detected during the verification to determine a software code coverage on an experimental control unit.

5. The method as recited in claim 1, wherein:
   the software functions are used for controlling operating sequences in a vehicle.

6. The method as recited in claim 5, wherein:
   an overall verification of the software functions is performed using a simulation device that simulates the vehicle, without the use of a real vehicle.

7. The method as recited in claim 1, wherein:
   the software code is divided into hardware-dependent software code and hardware-independent software code, and
   only the hardware-independent software code is used for the software functions for controlling operating sequences in a vehicle.

8. The method as recited in claim 1, wherein:
   paths running through in at least one of the software code and in the software functions are detected during the verification to determine a software code coverage on a standard control unit.

9. A system for verifying software functions for a control unit, using a simulation model to simulate the software functions and the control unit, comprising:
   a first experimental control unit;
   a second standard control unit;
   a communication link between the first experimental unit and the second standard control unit;
   a first arrangement for automatically generating the software code for the software functions from the simulation model, the simulation model being identical, firstly for the first experimental control unit and secondly for the second standard control unit, identical input variables for the software functions being used on both control units;
   a second arrangement for detecting output variables of both control units resulting therefrom synchronized in time; and
   a third arrangement for verifying the software functions through comparison of the output variables of both control units.

10. A computer-readable medium having stored thereon instructions adapted to be executed by a processor, the instructions which, when executed, cause the processor to perform a method for verifying software functions for a control unit in accordance with a simulation model to simulate the software functions and the control unit, the method comprising:
    automatically generating a software code for the software functions from the simulation model, the simulation model being identical, firstly for a first experimental control unit and secondly for a second standard control unit;
    using identical input variables for the software functions on the first experimental control unit and the second standard control unit;
    detecting as synchronized in time output variables of the first experimental control unit and the second standard control unit resulting from the input variables; and verifying the software functions through a comparison of the output variables of the first experimental control unit and the second standard control unit.

11. A method for verifying software functions for a control unit in accordance with a simulation model to simulate the software functions and the control unit, comprising:

for each of a first experimental hardware-implemented control unit and a second standard hardware-implemented control unit, automatically generating a software code for the software functions from the simulation model, the simulation model being identical, firstly for the first experimental hardware-implemented control unit and secondly for the second standard hardware-implemented control unit;

using identical input variables for the software functions on the first experimental hardware-implemented control unit and the second standard hardware-implemented control unit;

detecting as synchronized in time output variables of the first experimental hardware-implemented control unit and the second standard hardware-implemented control unit resulting from processing of the input variables via the generated software code; and verifying the software functions through a comparison of the output variables of the first experimental hardware-implemented control unit and the second standard hardware-implemented control unit.

* * * * *